No. 747,154. PATENTED DEC. 15, 1903.
L. DURAND.
DOUGH KNEADING MACHINERY.
APPLICATION FILED SEPT. 8, 1902.
NO MODEL.
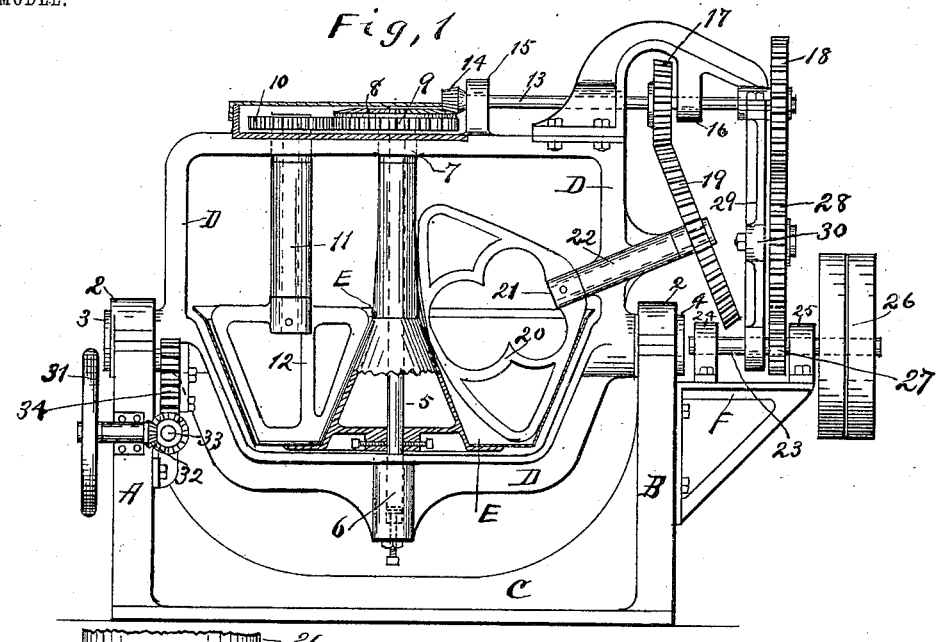
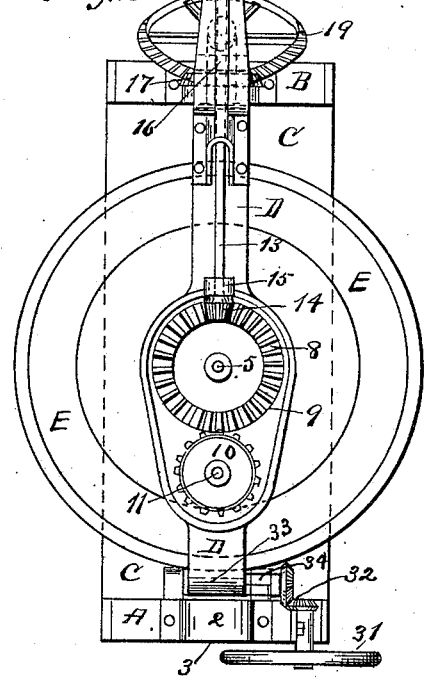
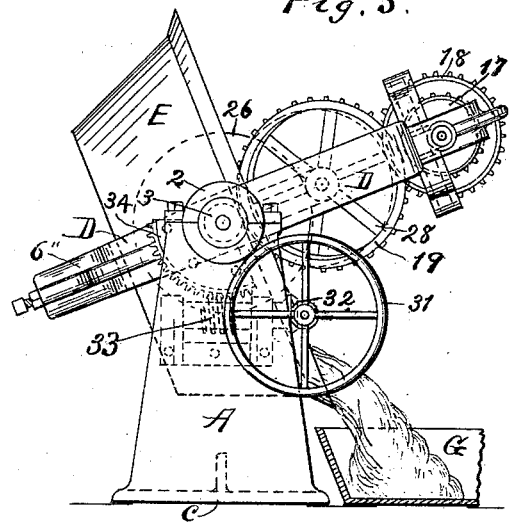
Witnesses
Inventor
Louis Durand
By his Attorney Benj. A. Dare No. 747,154. Patented December 15, 1903.

UNITED STATES PATENT OFFICE.

LOUIS DURAND, OF DUMONT, NEW JERSEY, ASSIGNOR TO THE AMERICAN EXCHANGE NATIONAL BANK OF NEW YORK, A CORPORATION OF NEW YORK.

DOUGH-KNEADING MACHINERY.

SPECIFICATION forming part of Letters Patent No. 747,154, dated December 15, 1903.

Application filed September 8, 1902. Serial No. 122,636. (No model.)

*To all whom it may concern:*

Be it known that I, LOUIS DURAND, a citizen of the United States, and a resident of Dumont, in the county of Bergen and State of New Jersey, have invented certain new and useful Improvements in Dough-Kneading Machinery, of which the following is a specification.

This invention relates to a type of dough mixing and kneading machines designed for the production of a comparatively large batch of dough, said type embodying a horizontally-rotatable pan of liberal capacity, together with a stirrer and kneader, both revolubly coactive within the pan, a pivotal pan-support being present for permitting the pan to be tilted when desired for the more convenient removal of the dough.

A prominent object of the present invention is to so locate the bearing-points of the pivotal pan-support with respect to the other parts of the machine that the load of the pan will be more nearly equalized during working.

A further object is to dispose certain parts connected with the gearing in a plane above the pan and its tilting axis, whereby a counterbalance tendency for the pan results, thus rendering it more readily operable for the removal of the dough.

With the above and other purposes in view my novel dough mixing and kneading machine comprises a tilting pan-support having suitably-mounted trunnions in a horizontal plane contiguous with that of the upper portion of the pan, together with certain parts pertaining to the actuating-gearing and which tend to counterbalance said pan and its load.

There are other important features and details connected with the invention, which, besides those previously alluded to, are clearly set forth in the subsequent extended description.

In the accompanying drawings, forming part of this specification, Figure 1 is an elevational view, partly in section, of a dough mixing and kneading machine embodying my invention. Fig. 2 is a plan view of the machine represented in Fig. 1, and Fig. 3 is a vertical end view.

Similar reference characters are employed to designate corresponding parts in the several figures of the drawings where they occur.

Suitable standards A B are mounted on the bed-plate C and are provided at their upper portions with bearings 2 2, in which bear the trunnions 3 4 of the pan-support, which is shown as being in the form of a swinging yoke D, embodying a lower part depressed relative to the plane of the trunnions and pendently supported between the standards. Many of the working parts of the machine are carried by this yoke.

The pan E, in which the combined mixing and kneading operation is to be conducted, is of comparatively liberal capacity and also of such depth and diameter that when in position within the lower part of the yoke its upper portion will be in a plane proximate with that of the trunnions. The pan is attached to a central vertical shaft 5, revolubly resting in a step-bearing 6 in the lower horizontal bar of the yoke D, the upper cross-bar of the yoke having a bearing 7, through and above which the shaft extends for the connection of the bevel-gear 8 and spur-gear 9, the latter meshing with a gear 10, secured to the upper end of a shaft 11, rotatably suspended from said upper bar and carrying within the pan the vertical stirrer 12.

On the inner end of an upper horizontal counter-shaft 13 is keyed a bevel-pinion 14, meshing with the gear 8. The shaft 13 turns in suitable bearings 15 16, mounted on the upper bar of the yoke. Also on the shaft 13 are keyed the angle-pinion 17 and gear 18, the former meshing with an angle-gear 19 for rotating the inclined kneader 20, through the the medium of the shaft 21, revolubly supported in the extended inclined bearing 22 on the adjacent upright of the upper portion of the yoke.

23 designates the main driving-shaft revolubly mounted in the bearings 24 25, carried by the bracket F, attached externally on the standard B. To the said driving-shaft is secured the driving-pulley 26 and pinion 27, the latter meshing with the intermediate gear 28, turning on a stub-shaft 30, carried by a member 29, pivotally connected at its ends with the counter and driving shafts, respectively. It will be observed that on account of the shaft 23 being concentric relative to the trunnion-axis of the yoke and, further, by reason of the employment of the member 29 the motion-transmitting pinion 27 will always be in mesh with the intermediate gear 28, irrespective of the swinging position of the yoke.

In order to dump the pan E, the pan-support constituted by the yoke is tilted by means including a hand-wheel 31, secured on the outer end of a short horizontal shaft rotatably supported in a bearing on the standard A and transmitting motion by bevel-gears 32 to a horizontal worm 33 at the inner side of the standard and meshing with a worm-gear segment 34, rigidly attached to the yoke D.

The operation and functions of the machine will be readily comprehended. The components for the production of the dough being introduced into the pan in the requisite proportions, the rotation of the pulley 26 will revolve the shaft 23, which through the medium of the coacting gearing will effect the horizontal rotation of the pan E and coincident rotation upon their axes of the stirrer 12 and kneader 20. When the dough is properly mixed and kneaded, it can be dumped into a receptacle G, notwithstanding the continued rotation of the pan, stirrer, and kneader gearing, the rotation of the hand-wheel causing the pan-support to tilt and with it the pan, the power required to dump the pan being minimized by the counterbalancing or load-equalizing effect resulting from the location of the yoke-trunnions in a plane contiguous to the top of the pan and the disposition of other parts coöperating to produce such effect.

The feature involving the integral relation of the depressed part of the yoke, the trunnions, yoke-uprights, and upper cross-bar besides conferring great strength to the machine also presents a simple and efficient medium enabling the convenient assemblage and location of the various parts more directly situated with respect to the pan.

It will be comprehended that by the described arrangement of pan-dumping devices, including the worm and worm-gear segment, the pan can be tilted to any required extent and be automatically held in any of its tilted positions by such worm engagement, which latter, in addition to its capacity for communicating the motion required to accomplish the tilting, possesses the capability of self-retaining the pan in any position to which it may be tilted. These dual functions of the worm and gear-segment are present coincidently during the actuation of the mixer and kneader, which can obviously contiue to work during any tilting movement or while the parts are held in any tilted position.

Having now described my invention, what I claim as new, and desire to secure by Letters Patent, is—

1. In a dough-machine, the combination with a pan-support comprising a pendent pan-receiving portion, and suitably-bearing upper trunnions for said portion adapted for a swinging movement thereof, of a pan within said support and having its upper portion in a plane proximate with the trunnion-axis, a movable device within said pan, and means for actuating said device.

2. In a dough-machine, the combination with a pan-support comprising a pendent pan-receiving portion, and suitably-bearing upper trunnions for said portion adapted for a swinging movement thereof, of a pan within said support, a movable device within said pan, means for actuating said device, and provision tending to counterbalance said portion, the pan and its load.

3. In a dough-machine, the combination with a pan-support comprising a pendent pan-receiving portion, and suitably-bearing upper trunnions for said portion adapted for a swinging movement thereof, of a horizontally-rotative pan within said support, a movable device within said pan, means for rotating the latter and actuating the device, and provision tending to counterbalance the pendent portion, the pan and its load.

4. In a dough-machine, the combination with a lower pendent pan-receiving portion and suitably-bearing trunnions in a relatively upper plane with respect to said portion and adapted for a swinging movement thereof, of a horizontally-rotative pan within said support and having its upper portion in a plane proximate with the trunnion-axis, movable means within said pan, a part carried by the pan-receiving portion and extending to a plane above said pan, and gear connections on said part for communicating motion to the pan and movable means therein, said part and gear connections tending to counterbalance the pan-receiving portion, the pan and its load.

5. In a dough-machine, the combination with a continuous vertical frame embodying a lower pendent, pan-receiving portion, an upper cross-bar and suitably-bearing trunnions in a relatively upper plane with respect to said portion and adapted for a swinging movement thereof, of a horizontally-rotative pan within said support and having its upper portion in a plane proximate with the trunnion-axis, shafts descending from the upper bar and geared with the pan and carrying a stirring device respectively, a kneader within said pan, an inclined shaft connected with said kneader and bearing in the frame above the pan, and gear connections for imparting motion downwardly through said shafts.

6. In a dough-machine, the combination with a vertical frame integrally presenting a lower pan-receiving portion, trunnions in a relatively upper plane with respect to said portion, side uprights above the trunnions, and an upper cross-bar, of suitable bearings in which said trunnions are mounted, a horizontally-rotative pan within the pendent portion, stirring and kneading devices within the pan, and gear connections supported in the frame above the axial plane of the trunnions and adapted for communicating motion to the pan and to the stirring and kneading devices.

7. In a dough-machine, the combination with a pan-support comprising a pendent pan-receiving portion, and suitably-bearing upper trunnions for said portion adapted for a swinging movement thereof, of a pan within said support and having its upper portion in a plane proximate with the trunnion-axis, a movable device within said pan, means for actuating said device, and means for tilting said support and for positively retaining it in either of its normal or tilted positions irrespective of the actuation of the device within the pan.

8. In a dough-machine, the combination with a pan-support comprising a pendent pan-receiving portion, and suitably-bearing upper trunnions for said portion adapted for a swinging movement thereof, of a pan within said support and having its upper portion in a plane proximate with the trunnion-axis, a movable device within said pan, means for actuating said device, and means including a worm and worm-gear for tilting said support and for positively retaining it in either of its normal or tilted positions irrespective of the actuation of the device within the pan.

Signed at New York, in the county of New York and State of New York, this 5th day of September, A. D. 1902.

LOUIS DURAND.

Witnesses:
ESTELLE MACCLOSKEY,
CHAS. E. BURDELL.